UNITED STATES PATENT OFFICE.

SAMUEL CLELAND DAVIDSON, OF BELFAST, IRELAND.

EXTRACTION OR COAGULATION OF INDIA-RUBBER FROM THE LATEX.

1,145,352.     Specification of Letters Patent.     Patented July 6, 1915.

No Drawing.     Application filed January 28, 1913. Serial No. 744,732.

*To all whom it may concern:*

Be it known that I, SAMUEL CLELAND DAVIDSON, of Sirocco Engineering Works, Belfast, Ireland, merchant, have invented certain new and useful Improvements in and Relating to the Extraction or Coagulation of India-Rubber from the Latex, of which the following is a specification.

My invention relates to the extraction or coagulation of india rubber from the latex obtained from rubber trees, and more particularly from the variety known as Pará or *Hevea Brasiliensis* and its object is to enable a product to be obtained which will have a creosote or carbolic acid or a like phenoloid body, uniformly and perfectly distributed throughout its mass, thus securing in a greater degree than hitherto the preservative and strengthening effects of the creosote, carbolic acid or the like upon the rubber. In some cases formaldehyde may also be incorporated with the rubber by the process. My invention is applicable to said latex while it is in the fluid condition in which it is collected from the rubber trees, and whether or not it has been subjected to previous treatment, such, for example, as when ammonia or other alkali or alkaline substance is added to the latex during or soon after its collection from the rubber trees to prevent a tendency which sometimes exists to spontaneous coagulation before the latex can be brought into the factory, or, when the latex, in order to preserve and retain it in a fluid condition is treated with formaldehyde or other suitable antiseptic having no coagulating action on the rubber when added to the latex.

According to one method of carrying my invention into effect, I firstly add to said fluid latex an alkaline and aqueous solution of a mixture consisting of creosote or carbolic acid, or an admixture thereof (hereinafter referred to as creo-carbolic) with a sufficient quantity of caustic alkali, such as caustic soda or potash, or an alkaline substance, such as biborate of soda, or any admixture of said substances, whereby said alkaline compound, or compounds of creosote or carbolic acid, or creo-carbolic is or are rendered soluble in water, and I may also employ therewith a small quantity of formaldehyde, for example about one part of formaldehyde to four or more parts of alkalized creo-carbolic, carbolic or creosote.

Suitable proportions for the preparation of the alkaline phenoloid body are for example one part of creosote or creo-carbolic and two or more parts of an aqueous solution of caustic soda or caustic potash of a strength of 50° Twaddell. If formaldehyde is added it may be employed in a proportion of one part of formaldehyde of 40% strength to each four or more parts of alkalized creosote or phenoloid. The proportions may however be varied within wide limits.

For brevity of description, said alkaline compounds of creosote, or carbolic, or creocarbolic as the case may be are hereinafter referred to as "alkalized creo-carbolic", it being understood that where alkalized creocarbolic is mentioned, alkalized carbolic alone, or creosote alone are included in the term.

When applying any of the above described preparations of alkalized creo-carbolic, a dilute aqueous solution thereof may for example be prepared in the ratio of one part of the mixture to about 20 or more parts of water, and a sufficient quantity thereof is added to the fluid latex to render it slightly alkaline, but exact proportions cannot accurately be defined by weight or measurement, owing to the fact that the latex from different localities often varies at different seasons, and morning and evening tappings also frequently vary in characteristics, and consequently involve variations in the treatment, but I find that effective results are usually obtained by adding the dilute aqueous solution of the selected mixture in just sufficient quantity to impart to the latex a slight alkaline reaction to test paper.

After the latex has been treated as above described, coagulation of the rubber therefrom is effected as in the already customary way by the addition of a dilute solution of any suitable acid or acid substance such, for example, as acetic, trichloracetic, sulfuric or hydrochloric acid or admixtures thereof.

The water employed for making the dilute solution of the alkalized creo-carbolic, for the first treatment of the latex, may be heated, or the latex may be heated before, after, or during the first treatment, and the water for making the dilute solution of acid for the second, or coagulating treatment may also, if desired be heated.

When coagulation of the rubber has been completely effected, it may be removed from the mother liquor, and the remnants of said mother liquor which adhere to the rubber, or are contained in its cellular structure are pressed and washed out, which may be done by passing the rubber through the ordinarily employed rubber rolling and washing machines, or preferably by drawing or calendering it out into thin sheets or bands between rollers with water trickling over them, which water may, if desired, be heated. The rubber is now ready for drying, and may be pressed into thin cakes, and dried in any of the ordinarily employed rubber drying apparatus, or, if finished in the form of thin sheets or bands, its drying can be effected by hanging same on poles in an airy room or shed, and, when sufficiently dried, it may be pressed in molds into blocks, or otherwise suitably prepared for transmission to the market.

I wish it to be understood that in the preparation of the alkalized creo-carbolic as herein described I do not limit myself to the particular alkalis or alkaline substance named, and further that for the second, or coagulating treatment of the latex, I do not limit myself to the employment of the particular acids referred to, as any acid or acid substance having a suitable neutralizing action on the alkalinity of the alkalized creo-carbolic of the first treatment of the latex, and a coagulating effect on the rubber may be employed.

In the ordinary smoking of rubber it is true that a certain amount of phenoloid bodies are introduced by the smoke in combination with pyroligneous and other acids, and concurrently with its introduction coagulation of the rubber from the latex occurs but by treating the latex with an alkaline solution of the phenoloid body or bodies according to the present invention same mixes intimately with the fluid latex and without causing any coagulation of the rubber therefrom until the latex is treated with an acid or acid substance whereupon the rubber which coagulates out therefrom is evenly impregnated with creosote, carbolic, or creo-carbolic as the case may be.

What I claim and desire to secure by Letters Patent is:—

1. In a process for the treatment of india rubber latex, adding to the liquid latex a dilute alkaline solution of a phenoloid body as a preparatory treatment thereof, prior to coagulation of the contained rubber therefrom.

2. In a process for the treatment of india rubber latex, adding to the liquid latex a dilute alkaline solution of a phenoloid body and formaldehyde as a preparatory treatment thereof prior to coagulation of the contained rubber therefrom.

3. A process for extracting india rubber from latex, comprising adding to the liquid latex a dilute alkaline solution of a phenoloid body, and coagulating the rubber contained in the latex by an acid substance.

4. A process for extracting india rubber from latex, comprising adding to the liquid latex a dilute alkaline solution of a phenoloid body and formaldehyde and coagulating the rubber contained in the latex by an acid substance.

5. In a process for the treatment of india rubber latex, adding to the liquid latex a dilute alkaline solution of creosote as a preparatory treatment thereof prior to coagulation of the contained rubber therefrom.

6. In a process for the treatment of india rubber latex, adding to the liquid latex a dilute alkaline solution of creosote and formaldehyde as a preparatory treatment thereof prior to coagulation of the contained rubber therefrom.

7. A process for extracting india rubber from latex, comprising adding to the liquid latex a dilute alkaline solution of creosote, and coagulating the rubber contained in the latex by a dilute acid solution.

8. A process for extracting india rubber from latex, comprising adding to the liquid latex a dilute alkaline solution of creosote and carbolic acid, and coagulating the rubber contained in the latex by an acid solution.

9. In a process for the treatment of india rubber latex, adding to the liquid latex a dilute alkaline creo-carbolic solution as a preparatory treatment thereof prior to coagulation of the contained rubber therefrom.

10. In a process for the treatment of india rubber latex, adding to the liquid latex a dilute alkaline creo-carbolic solution and formaldehyde as a preparatory treatment thereof prior to the coagulation of the contained rubber therefrom.

11. A process for extracting india rubber from latex, comprising adding to the liquid latex a dilute aqueous alkalized creo-carbolic solution and coagulating the rubber contained in the latex by a dilute solution of an acid substance, substantially as described.

12. A process for extracting india rubber from latex, comprising adding to the liquid latex a dilute aqueous alkalized creo-carbolic solution and formaldehyde, and coagulating the rubber contained in the latex by a dilute solution of an acid substance, substantially as described.

13. Process for extracting india rubber from latex, comprising adding to the liquid latex a dilute aqueous creo-carbolic solution alkalized by biborate of soda, and coagulating the rubber contained in the latex by a dilute acid solution, substantially as described.

14. In a process for extracting india rubber from latex, adding to the liquid latex an alkaline solution of a phenoloid body as a preparatory treatment thereof, prior to coagulation of the contained rubber therefrom.

15. A process for extracting india rubber from latex, comprising adding to the liquid latex an alkaline solution of a phenoloid body, and coagulating of the rubber contained in the latex by an acid substance.

16. A process for extracting india rubber from latex, comprising liberating in the rubber latex a phenoloid from an alkalized phenoloid contained in solution therein, by addition of an acid substance applied for coagulating the india rubber from the latex.

In witness whereof, I have hereunto signed my name in the presence of two subscribing witnesses.

SAMUEL CLELAND DAVIDSON.

Witnesses:
JOHN JOHNSON,
HUGH TAYLOR COULTER.